United States Patent [19]

Jodrey et al.

[11] 4,405,301

[45] Sep. 20, 1983

[54] BOTTLE TURNER

[75] Inventors: Robert M. Jodrey, Westboro; Warren R. Pitts, Needham, both of Mass.

[73] Assignee: Dennison Manufacturing Company, Farmingham, Mass.

[21] Appl. No.: 319,569

[22] Filed: Nov. 9, 1981

[51] Int. Cl.³ .................... F27B 9/14; C03B 23/00; B65G 47/12; F24J 3/00

[52] U.S. Cl. .................... 432/124; 65/272; 198/451; 432/230; 432/231

[58] Field of Search .............. 432/11, 124, 230, 231, 432/239; 65/271, 272; 198/451

[56] References Cited

U.S. PATENT DOCUMENTS 3,320,397  5/1967  Alexander et al. ............ 432/11
3,503,595  3/1970  Olson et al. ............ 432/231

Primary Examiner—John J. Camby
Attorney, Agent, or Firm—Arthur B. Moore

[57] ABSTRACT

Apparatus for turning bottles and the like during exposure to a jet of hot gas or other heat source. Bottles are individually passed by an air cylinder gate and travel to a drive wheel and a spring loaded idler, where they are trapped by a second air cylinder gate. The drive wheel turns the bottle over a predetermined revolution while the bottle face is exposed to heat. The bottle is then permitted to exit by retraction of the second air cylinder gate. A pneumatic assembly controls gate operation, along with mechanical actuation to prevent bottle entrapment in the heating area.

20 Claims, 5 Drawing Figures

BOTTLE TURNER

BACKGROUND OF THE INVENTION

The present invention relates to the handling of bottles and the like and more particularly to bottle turning apparatus for use in connection with the heat treatment of bottles.

U.S. Pat. No. 3,616,015, commonly assigned with the present application, discloses a heat transfer method for labelling clear plastic containers. It is useful in this process to expose the bottle after labelling to a high temperature jet of gas or other heating apparatus in order to melt the label material with minimal heating of the underlying surface. This patent discloses simple heating apparatus involving successive heating stations with an intervening bottle turning station. Such apparatus suffers the limitations of requiring numerous heating elements to achieve a limited heating effect, and of providing an uneven heating profile due to the lack of bottle rotation during heating.

Another type of prior art bottle handling apparatus for use in connection with heat treatment engages each bottle at its base between opposing belts which turn the bottle while exposing its upper portion to the heating element. Bottle handling apparatus of this type is suitable for a limited range of bottle diameters, and requires unwieldy mechanical adjustments.

Accordingly, it is a principal object of the invention to provide improved bottle handling apparatus for use in combination with a heat treatment device. A related object is the achievement of apparatus of this nature which is compatible with a range of bottle diameters.

Another object of the invention is the handling of bottles during heating to achieve an even heating profile.

A further object of the invention is the provision of apparatus of this nature which efficiently heats the bottle surface.

SUMMARY OF THE INVENTION

In furthering the above and related objects, the invention provides improved apparatus for continuously turning a bottle during exposure to a heat source. The bottle turner incorporates a pneumatically regulated transport system including infeed and discharge exit air cylinder gates. The turning mechanisms consist of a drive wheel and spring loaded idler gate which engage the bottle at a separate area from the portion to be heated, and turn it through a prescribed revolution.

In accordance with one aspect of the invention, bottles are individually released from a backlog on an infeed conveyor by a timed retraction of the infeed air cylinder. The single bottle travels to the heating site, where it is trapped by the discharge air cylinder gate. After completion of the turning cycle, the discharge rate retracts to allow the bottle to exit.

In accordance with another aspect of the invention, the air cylinder gates are each mechanically actuated to provide predetermined gate positions, in the absence of a pneumatic signal. In the preferred embodiment, this is accomplished by the spring loading of each of the air cylinders. The infeed air cylinder is biased in the extended position, while the discharge air cylinder is biased in the retracted position. This achieves the safety feature of preventing the entrapment of bottles in the heating area in the event of the accidental loss of air pressure.

In accordance with still another aspect of the invention, the air cylinder gates are actuated from the pneumatic control circuit to periodically override their mechanical bias. In the preferred embodiment in which the heating apparatus is employed in concert with a heat transfer decorator, the pneumatic circuitry receives a timing pulse during each decorator cycle to retract the infeed gate. The air signal to the infeed gate preferably has a duration established by an adjustable time delay to allow a single bottle to clear the gate. At the end of this period the infeed gate extends along with the discharge gate, so that the latter traps the bottle in the heating area. The bottle is turned over a period established by a second pneumatic time delay, after which the discharge gate retracts.

In accordance with yet another aspect of the invention, the drive wheel, idler wheel, and air cylinders are mounted so that the user may adjust their heights and lateral positioning in accordance with the bottle geometry. The speed of the drive wheel may be modified by the user to achieve a desired bottle revolution, with reference to the turning period and bottle diameter. These adjustments ensure uniform bottle rotation and unencumbered exposure of the bottle face to the heating elements.

BRIEF DESCRIPTION OF THE DRAWINGS

The above and additional aspects of the invention are illustrated with reference to the detailed description which follows, taken in conjunction with the drawings in which.

DETAILED DESCRIPTION

Figure 1:
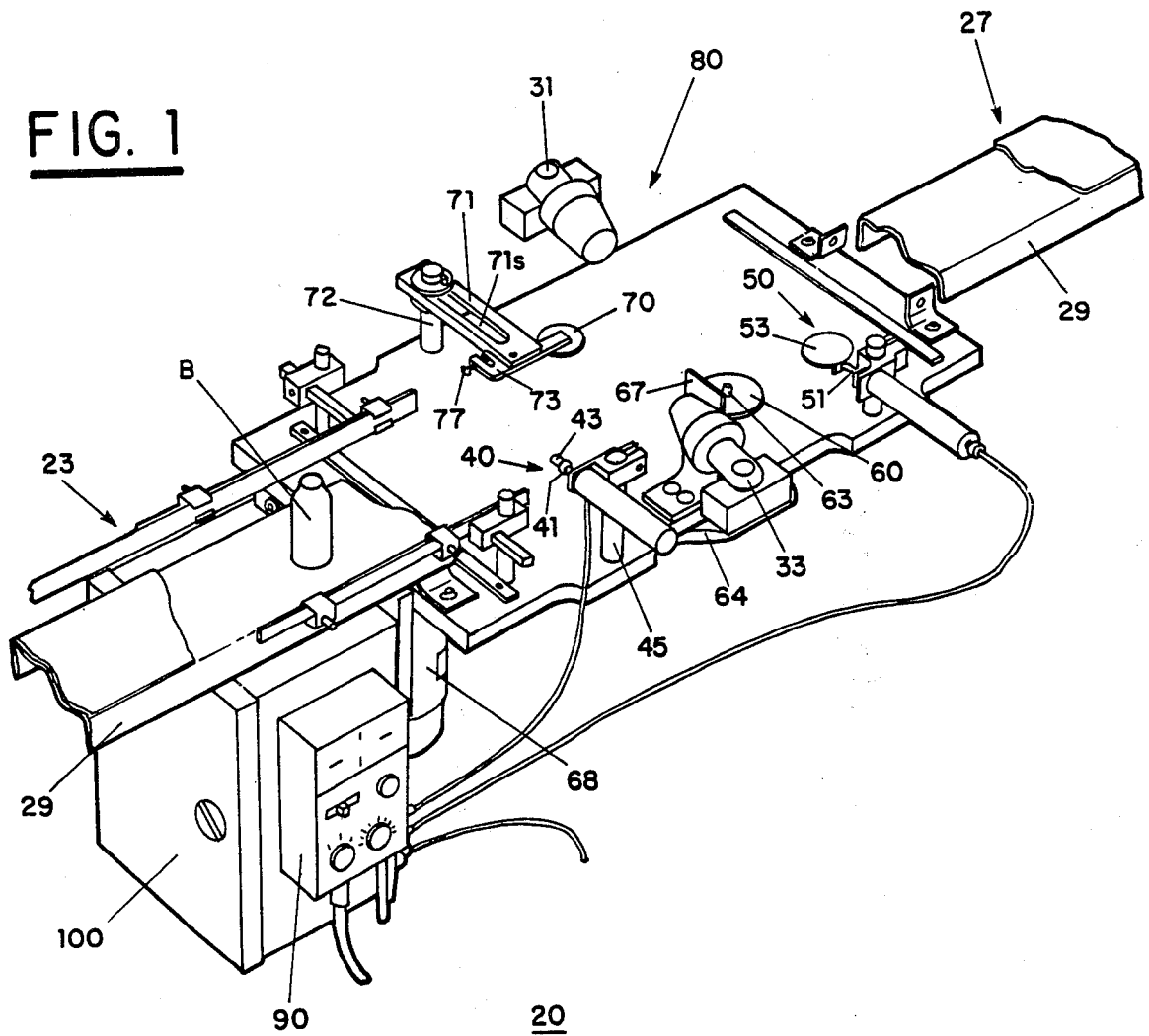
FIG. 1 is a perspective view of bottle handling and heating apparatus in accordance with the preferred embodiment.

The bottle turning apparatus of the invention is utilized in the preferred embodiment for the preheating and postheating of the bottles which are decorated using the heat transfer decoration technique disclosed in illustrative U.S. Pat. Nos. 2,862,832; 2,989,413; 3,616,015; and 3,922,435. The bottle handling apparatus 20 shown in the perspective view of FIG. 1 receives bottles on an infeed conveyor 23, transports these bottles on a bottle turner conveyor (not shown) through a bottle turning station 80, and releases the bottles to an outfeed conveyor 27. Advantageously, these conveyors comprise a single conveyor belt 29, shown in part at each end of the apparatus. While engaged at the bottle turning station 80, a given bottle B is rotated through a preselected number of revolutions while exposing the bottles to streams of high temperature gas provided by burner heads 31 and 33. Optionally, the conveyor 29, bottle handling apparatus 20, and heating assembly are discrete units.

With further reference to FIG. 1, bottles B (of which only a single one is shown) are delivered at intervals on infeed conveyor 23, and form a backlog against infeed gate 40. Gate 40 comprises an air cylinder 41 which extends and retracts a stop member 43. The infeed gate 40 is retracted once during each machine cycle for a period sufficient to allow the passage of a single bottle.

The bottle B travels on conveyor 29 to the turning site 80, where it is arrested by a discharge gate 50 and engaged between a drive wheel 60 and a spring loaded idler wheel 70. While in this location, the bottle B is rotated and exposed to flames from heating elements 31 and 33. After rotation and heating for a predetermined period, the discharge gate 50 retracts and releases the bottle B.

With reference to the plan view of FIG. 1, the turning apparatus 20 may be adapted to bottles having a variety of geometries (i.e. diameter, height, and shape). Each air cylinder gate is mounted so that the user may vary its height and orientation. For example, the discharge gate 50 is mounted on a post 55 at an adjustable height and angular orientation. Similarly, the drive wheel 60 is mounted at an adjustable height via a set screw (not shown) on a shaft 63. The idler wheel 70 is carried on spring loaded idler arm 73 which is pivotally mounted on a bracket 71; the undeflected position of idler arm 73 may be finely adjusted using screw 74. The bracket 71 has a slot 71s and is clamped to a post 72, so that the user may vary the height of idler wheel 70 by lowering or raising bracket 71 on post 72, and may place idler wheel 70 at a desired transverse location by varying the clamping position within slot 71s. Burner heads 31 and 33 may be located at various separations depending on the bottle diameter. Advantageously, burner 31 is separated from drive wheel 60 by a shield 67.

Figure 2A:
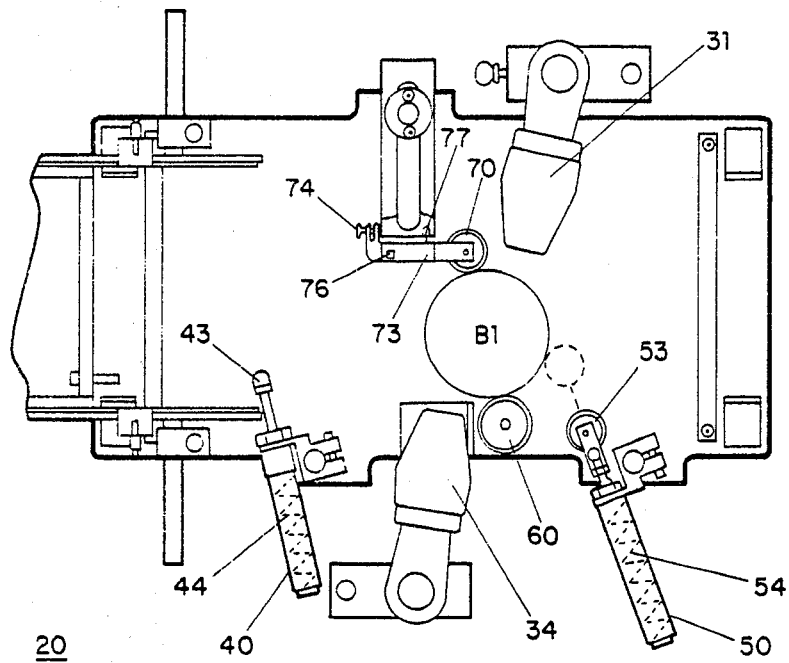
FIG. 2A is a partial plan view of the apparatus of FIG. 1, adjusted to handle a bottle of relatively small diameter.
Figure 2B:
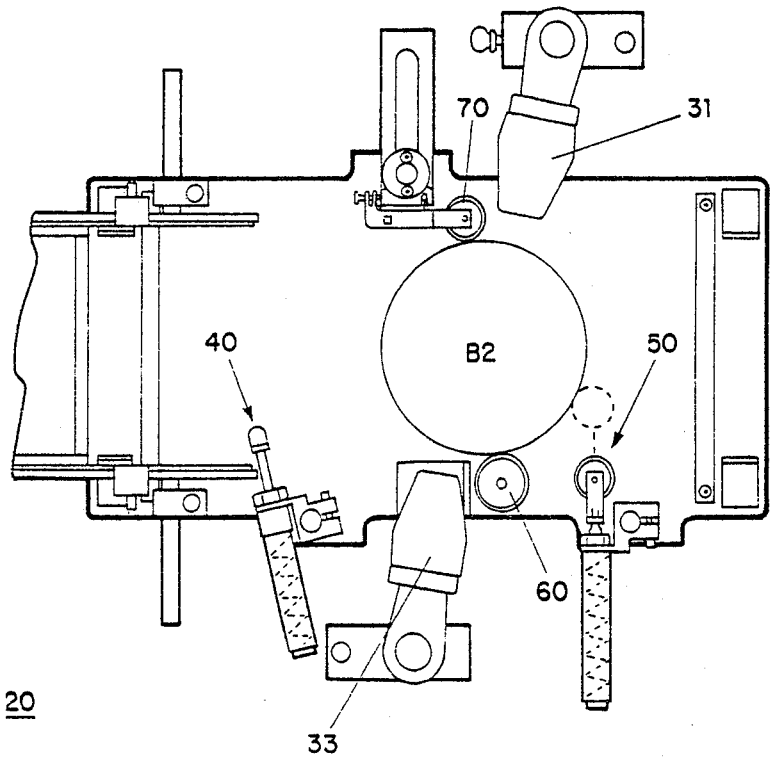
FIG. 2B is a partial plan view of the apparatus of FIG. 1, adjusted to handle a bottle of relatively large diameter.

In the plan view of FIG. 2A, the various elements of bottle turner 20 are placed for the handling of bottle B1 of relatively small diameter. In the plan view of FIG. 2B, these elements have been repositioned for a bottle B2 of approximately double the diameter of bottle B1.

The appropriate height of drive wheel 60 and idler wheel 70 depends on a variety of factors. The wheels should be placed below the gas flame from burners 31 and 33. If a bottle B has a bottom radius, the wheels should be set above the radius. For bottles with footed bottoms, the wheels may be placed to engage the bottle foot.

Referring to FIG. 1, the shaft 63 of drive wheel 60 is driven from a pulley and belt assembly 64, which in turn is powered from a variable speed motor 68. The user may adjust the speed of motor 68 from control box 90 to provide a desired angular velocity of drive wheel 60. This angular velocity determines the heating of bottle B, along with the bottle diameter and the period of extension of discharge gate 50.

A given bottle B on arriving at the heating site 80 wedges between drive wheel 60 and idler wheel 70, and rests against a further idler wheel 64 at the end of discharge air cylinder 51. With reference to FIG. 2A, the idler arm 73 carrying idler wheel 70 is pivotally mounted at dowel pin 76, and subjected to an outward tension by compression spring 77. Idler arm 73 therefore retracts to accommodate the arrival of a bottle B. Adjusting screw 74 limits the outward pivotting of idler arm 73 in the absence of a bottle B.

In the preferred embodiment, air cylinder gates 40 and 50 include internal compression springs 44 and 54 (shown in phantom), which exert tension on the respective air cylinders in a given direction. Compression spring 44 tends to extend infeed gate 40, while spring 54 tends to retract gate 50. These gates will remain respectively extended and retracted in the absence of a countervailing air pressure of sufficient magnitude. Therefore, in the event of a loss of air pressure from pneumatic control circuit 100, gate 40 will prevent this further infeed of bottles while gate 50 will permit the exit of any bottle in heating area 80.

Figure 3:
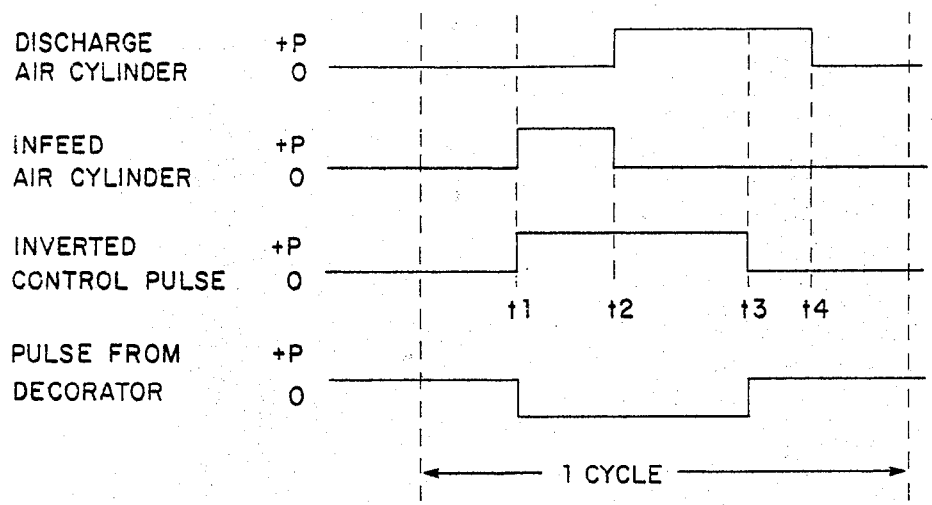
FIG. 3 is an illustrative time plot of control air pressure and air pressure to the two gates.

As shown in the illustrative plot of FIG. 3, air cylinder gates 40 and 50 are actuated in a timing sequence determined by pneumatic signals from pneumatic control assembly 100. Control assembly 100 receives a timing pulse from the decorating area (not shown) of decorator 10 at a given point of each decoration cycle; this is shown in the bottom plot of FIG. 3. The rise of this decoration pulse triggers an air pulse causing the retraction of infeed cylinder gate 40. The duration of the air pulse to infeed cylinder 40 is determined by a time delay sufficient to allow a single bottle to clear air cylinder gate 40. The fall of this air pulse triggers the rise of an air pulse to discharge cylinder 50, causing the extension of this cylinder. The air pulse to discharge gate 50 is also determined by a time delay built into the pneumatic control circuitry 100 in accordance with the desired duration of bottle rotation at flaming station 80.

Figure 4:
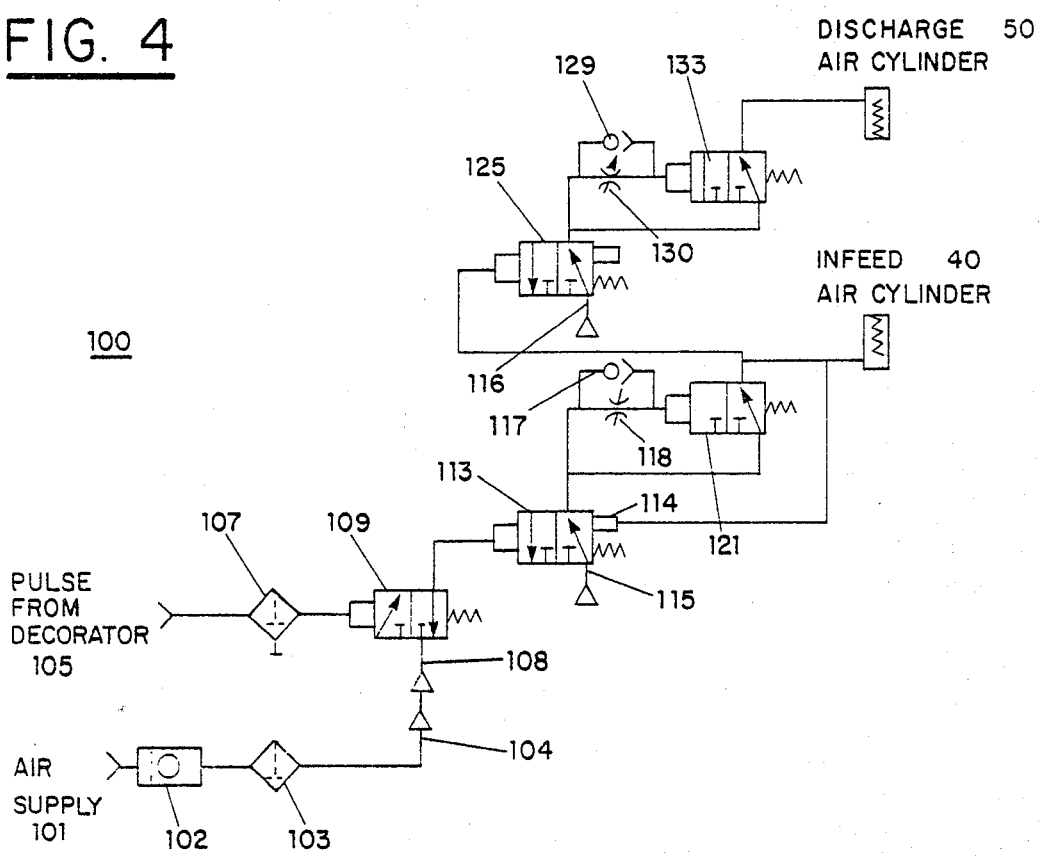
FIG. 4 is a schematic diagram of preferred pneumatic control circuitry for the apparatus of FIG. 1.

FIG. 4 gives a schematic illustration of pneumatic circuitry 100 of a design suitable for implementing the timing sequence shown in FIG. 3 in actuating the air cylinder gates of FIG. 1. Pneumatic circuit 100 receives an air supply 101 through a pressure regulator 102 and filter 103. This high pressure air is routed via line 104 to input port 108 of valve 109, input port 115 of valve 113, and input port 116 of valve 125. Circuit 100 also receives as a periodic input a pulse 105 from decorator 10 which passes through filter 107 to the pilot of valve 109. The various valves, also including valves 121 and 133 and associated structures, provide air signals to infeed air cylinder 40 and discharge air cylinder 50 in accordance with the schedule of FIG. 3.

At the beginning of each decoration cycle, with a positive pressure signal from decorator 10 and valve 109 in the open position, neither air cylinder gate receives an air signal and cylinder 40 therefore is extended while cylinder 50 is retracted. Upon the fall of the decorator pulse, pressure valve 109 is closed, exhausting the pilot of valve 113 and actuating valves 113 and 121, and causing the retraction of air cylinder 40. Valve 121 has at its input pilot a check valve 117 and flow restrictor 118, which prevent the passage of air to the pilot over a user-selected time delay established by the setting of the flow restrictor 118. At the end of this interval, high pressure air passes to the pilot of valve 121, which is then closed, causing the actuation of valves 125 and 133. Both air cylinder gates 40 and 50 are extended at this point. Valve 113 includes an auxiliary pilot 114 which receives high pressure air in order to prevent the premature deactuation of this valve in the event of the intervening rise of the air pulse 105. This feature permits completion of the timing cycle of valve 121 under these conditions. Valve 133 similarly includes a check valve 129-flow restrictor 130 combination in order to provide a user-determined time delay. At the end of this time delay, the flow of air to the input pilot of valve 133 causes the retraction of discharge air cylinder gate 50.

While various aspects of the invention have been set forth by the drawings and the specification, it is to be understood that the foregoing detailed description is for illustration only and that various changes in parts, as well as the substitution of equivalent constituents for those shown and described, may be made without departing from the spirit and scope of the invention as set forth in the appended claims.

I claim:

1. Apparatus for heating bottles and the like comprising:
   continuously moving conveyor means for frictionally engaging bottles and urging them along a transport path;
   a first gate comprising a first stop member for arresting the progress of bottles frictionally engaged by said conveyor means, and means for extending and retracting said first stop member respectively into and out of the transport path of said bottles;
   a second gate, comprising a second stop member for arresting the progress of bottles frictionally engaged by said conveyor means while permitting their rotation, and means for extending and retracting said second stop member respectively into and out of the transport path of said bottles;
   means for turning any bottle arrested by said second gate; and
   means for heating any bottle arrested by said second gate.

2. Apparatus as defined in claim 1, wherein said conveyor means comprises a moving belt conveyor underlying said bottles.

3. Apparatus as defined in claim 1 wherein said first and second gates comprise air cylinder gates.

4. Apparatus as defined in claim 3 wherein said first stop member is mechanically biased toward its extended position and intermittently pneumatically biased toward its retracted position, and wherein the second stop member is mechanically biased toward its retracted position and intermittently pneumatically biased toward its extended position.

5. Apparatus as defined in claim 4 wherein the first and second air cylinder gates are mechanically biased by compression springs.

6. Apparatus defined in claim 4 further comprising pneumatic control means for delivering first and second air signals respectively to the first and second air cylinder gates in order to determine the position of each gate.

7. Apparatus as defined in claim 6, wherein said first air cylinder gate is mechanically biased toward the extended position, and said first air signal induces the retraction of said first air cylinder gate; and
   wherein said second air cylinder gate is mechanically biased toward the retracted position, and said second air signal induces the extension of said second air cylinder gate.

8. Apparatus as defined in claim 7 wherein said first air signal has a duration sufficient to allow the passage of a single bottle by said first air cylinder gate.

9. Apparatus as defined in claim 7 wherein said second air signal has a duration in accordance with the desired period of bottle heating.

10. Apparatus as defined in claim 1 wherein the second stop member comprises an idler wheel, and the turning means comprises:
    a rotatable drive wheel for frictionally engaging a bottle;
    a second idler wheel which is mounted at a variable separation from the drive wheel to engage a different portion of the bottle; and
    means for rotating said drive wheel at a predetermined angular velocity, thereby turning said bottle.

11. Apparatus as defined in claim 10 further comprising means for biasing said idler wheel toward said drive wheel to firmly engage said bottle.

12. Apparatus as defined in claim 10 further comprising means for adjusting the predetermined angular velocity of said drive wheel.

13. Apparatus as defined in claim 4 wherein the drive wheel and idler wheel are mounted to permit adjustment of their height.

14. Apparatus as defined in claim 1 wherein the first and second gates are mounted to permit adjustment of their height and orientation.

15. Apparatus as defined in claim 1 wherein the heating means comprises first and second burners for directing gas flames towards any bottle arrested by said second air cylinder gate.

16. Apparatus as defined in claim 15 wherein the first and second burners are mounted to permit adjustment of their separation.

17. Apparatus for heating bottles and the like, comprising:
    continuously moving conveyor means for frictionally engaging bottles and urging them along a transport path;
    a first air cylinder gate, comprising a first stop member for arresting the progress of bottles frictionally engaged by said conveyor, means for mechanically biasing said first stop member toward an extended position in the transport path of said bottles, and means for intermittently pneumatically biasing said first stop member toward a retracted position out of the path of said bottles;
    a second air cylinder gate comprising a second stop member for arresting the progress of bottles frictionally engaged by said conveyor while permitting their rotation, means for mechanically biasing said second stop member toward a retracted position out of the transport path of said bottles, and means for intermittently pneumatically biasing said second stop member toward an extended position into the transport path of said bottles;
    means for turning any bottle arrested by said second air cylinder gate; and
    means for heating any bottle arrested by said second air cylinder gate.

18. Apparatus as defined in claim 17 further comprising pneumatic control means for delivering first and second air signals respectively to the first and second air cylinder gates to actuate the respective pneumatic means.

19. Apparatus as defined in claim 18 wherein said first air signal has a duration sufficient to allow the passage of a single bottle by said first air cylinder gate.

20. Apparatus as defined in claim 18 wherein said second air signal has a duration in accordance with the desired period of bottle heating.

* * * * *